(12) United States Patent
Bergenfield et al.

(10) Patent No.: US 6,221,418 B1
(45) Date of Patent: Apr. 24, 2001

(54) HIGH PROTEIN EDIBLE COMPOSITION AND METHOD OF PREPARING THE SAME

(75) Inventors: Lawrence Bergenfield, Las Vegas, NV (US); S. Keith Klein, IV, Houston, TX (US); Ronald Peter Splinter, Chicago, IL (US); Samuel Calderon, Los Alamitos, CA (US)

(73) Assignee: Focused Foods, Inc., Las Vegas, NV (US)

( * ) Notice: Subject to any disclaimer, the term of this patent is extended or adjusted under 35 U.S.C. 154(b) by 0 days.

(21) Appl. No.: 09/448,173

(22) Filed: Nov. 24, 1999

Related U.S. Application Data

(60) Provisional application No. 60/126,192, filed on Mar. 25, 1999.

(51) Int. Cl.$^7$ ............................ A21D 10/00; A21D 13/00
(52) U.S. Cl. ..................... 426/549; 426/446; 426/653; 426/656; 426/661; 514/2
(58) Field of Search .................................... 426/446, 549, 426/653, 656, 661, DIG. 804, DIG. 808, 2, 866

(56) References Cited

U.S. PATENT DOCUMENTS 3,930,055 * 12/1975 Engleman et al. ................... 426/644

* cited by examiner

Primary Examiner—Nina Bhat
(74) Attorney, Agent, or Firm—Arent, Foxokintner & Kahn, PLLC

(57) ABSTRACT

A dough composition for producing a baked, edible, high protein product having a protein concentration, based on calories, of at least 25%, comprising:
   (a) a mixture of high protein components,
   (b) flour,
   (c) leavening agent,
   (d) sweetener, and
   (e) water.

54 Claims, No Drawings

HIGH PROTEIN EDIBLE COMPOSITION AND METHOD OF PREPARING THE SAME

This application claims the benefit of U.S. Provisional Application No. 60/126,192 filed Mar. 25, 1999.

BACKGROUND OF THE INVENTION

1. Field of the Invention

The invention relates to edible nutritional compositions and a method for their preparation. More particularly, the present invention relates to baked high protein and high protein/low fat edible compositions and to a method of preparing such compositions.

2. Description of Related Art

Dietary supplements have been used for decades in both emerging countries and developed countries to supply nutrients missing from a basic diet or to correct the diets of individuals with specialized needs. Although dietary inadequacies are generally more severe and widespread in developing countries, nutritional supplements have been used in both the developing and developed countries of the world to increase the levels of not only vitamins and minerals, but also calories (frequently in the form of carbohydrates) and protein in a basic diet as well as in specialized diets.

The type of physical activity required by many types of work and athletic pursuits place greater demands on the bodies of those people involved in such endeavors, requiring consumption of high levels of certain types of nutrients. Frequently, the diet of the average person either does not supply sufficient amounts of those nutrients or does not supply them at appropriate times. For example, certain types of jobs and sports activities involve repetitive energy consuming motions requiring endurance and stamina. Such activity requires a larger caloric intake than the diet of the average person in order to meet the physical demands of such an activity while maintaining a constant body weight. The maximum biochemical benefit to the individual is achieved by consuming large amounts of carbohydrate before, during and immediately after such physical activity. The ever increasing consumption of carbohydrate-containing sports drinks and so-called energy bars reflects the popularity of such supplements among runners and cyclists. Those people whose occupations or athletic pursuits involve strenuous activities which depend on muscular strength, rather than muscular endurance, frequently require dietary supplements of protein. Protein, and the amino acids which form them, have been shown to increase muscle mass.

While it is known that an athlete engaged in a high endurance sport can consume above average amounts of carbohydrates, and particularly fat, without detriment, numerous studies have shown that the average individual who does not engage in such energy consuming activity, is frequently adversely affected by a high fat diet. Thus, populations and population subgroups which have low fat diets, particularly low saturated fat diets, have a lower incidence of both heart disease and certain types of cancer. Studies also show that health benefits accrue to those whose diets are high in protein and who consume foods with low glycemic values. Glycemic values are based on the glycemic index, a measure of how various substances affect the body's vital blood-glucose levels. The glycemic index measures the rate at which fifty grams of carbohydrate is broken down and absorbed into the bloodstream. Foods with low glycemic values take longer to be broken down.

Nutritional supplements take many forms, varying in some instances with the intended application. They have been used in the form of liquids, powders, pills or tablets and confectionery bars to supply diets with additional vitamins, minerals or other food groups. Protein supplements, as currently used by athletes, are available commercially in several forms, such as powders, tablets and self-supporting solid structures. The powders are typically sprinkled on or mixed with other foods and most typically mixed with a liquid such as water or milk. Flavoring agents and other additives are typically used to make the supplement more palatable and more easily dispersed in a liquid medium. The self-supporting solid structures are available commercially, typically as confectionery bars, e.g. "candy" bars. Like their powdered counterparts, they usually contain flavoring agents and other additives intended to provide better texture and palatability.

The self-supporting solid protein supplements have found widespread acceptance by the public in recent years for several reasons. First, they are commonly prepackaged in single serving portions. This avoids the necessity of measuring quantities, as required by their powdered counterparts. In their typical commercially available form, being individually wrapped, they avoid contamination and may be easily transported under a variety of conditions. Another factor in their widespread acceptability has been the use of the many of the flavoring agents commonly employed in confections.

Unlike the confections industry, where generally little emphasis is placed upon the nutritional content of the components, the content of the targeted dietary supplement in the product is of major importance to the dietary supplement industry and the typical consumer of such products. Thus, a major concern of a manufacturer of dietary supplements is maintaining consistency of the concentration of a targeted supplement throughout the manufacturing process and for an extended shelf life. One of the major problems of protein supplement bars have been both in maintaining a constant level of protein during the manufacturing process as well as for an extended period of time after the process.

Another problem also has been to maintain consistency in the taste and texture of the protein supplement bar. Changes in moisture and, concomitantly, hardness adversely affect the texture and "mouth feel" of many protein supplement bars over a protracted period of time. The type of high protein bars commercially available heretofore, has been restricted to a great degree by limitations on the types of processes which may be used in preparing such products. For example, heat is known to denature protein. Thus, when temperatures above about 400° F. (205° C.) are used in a process step, significant protein denaturation or degradation occurs. It is typical for protein levels to drop about 20 to 35% from their initial amounts in a formulation when higher temperatures, such as those used at bakery oven heat, are employed. Because of significant protein loss due to the effects of heat, processes are employed using ambient temperatures of no more than about 75° F. As a consequence, most manufacturers who produce high protein bars currently use an extrusion process. While eliminating a major shortcoming of baked products, degradation of protein, the extruded high protein products generally lack the textural characteristics of a baked product and tend to turn hard and become unstable over time in all aspects of quality, including taste, texture and appearance, resulting in a shelf life of less than six (6) months. Furthermore, baked nutritional supplements in the form of self-supporting structures, such as cookies, biscuits or cakes, currently commercially available to the public, generally have a notably lower protein level than other types of edible, self-supporting structures described as having a high protein content. Accordingly, there is a desire by the public for high protein self supporting structures, particularly baked goods, with the type of consistency commonly found in conventional baked goods.

It is an object of the present invention to obtain high protein edible products with an extended shelf life which are capable of maintaining a consistent texture for a protracted period of time. It is also an object of the invention to obtain such high protein edible products in a form other than extruded products, preferred being a baked product. It is desirable to obtain a food supplement bar which contains both a high concentration of protein and low glycemic index values in the form of a baked product. It is also desirable to obtain baked products having high protein and low fat concentrations which also have extended shelf life. It is a further object of the invention to provide dough compositions suitable for the preparation of the above products. It is an additional object of the invention to provide methods of preparing both the dough compositions and the baked products of the invention.

SUMMARY OF THE INVENTION

The present invention is directed to high protein edible compositions, to high protein dough compositions, and to processes for preparing the same. More specifically, the present invention is directed to high protein edible baked products having characteristics, typically associated with such baked products and to the dough compositions used to prepare them. The baked dietary supplements of the present invention have an extended shelf life, and consistency of texture, taste and appearance over a protracted period of time. Other embodiments of the present invention include edible baked high protein compositions having low fat concentrations and the dough compositions used to form the baked goods. Still other embodiments of the present invention include an edible baked high protein composition having low glycemic values and the dough compositions for forming same. Other preferred embodiments of the present invention include edible, baked high protein compositions having both low fat concentrations and low glycemic values and the dough compositions for forming same. All of the baked, edible compositions of the present invention have protracted shelf lives, particularly when combined with a suitable packaging.

The unique characteristics of the baked products of the present invention (high protein content, extended shelf life of six months or longer and consistency of texture and moisture level) results from a combination of process steps and the particular ingredients (and specified concentrations) employed. It is the uniqueness of the blend of proteinaceous materials used which results in the finished processed products (i.e., after blending, kneading, baking etc.) that differ little in protein concentration from the original blended composition, after changes in moisture are taken into account. Likewise, the unique composition of the proteinaceous materials also permits a baked product to be prepared with the texture sought and encountered in many baked products having normal (i.e., low) protein concentrations (i.e. below 25% by weight, based on calories).

The edible high protein compositions of the present invention may take a variety of baked forms, such as cookies, pretzels, popcorn cakes, rice cakes, etc. The protein concentration in the products of the present invention range, by weight, based on calories from about 25 to about 35%.

Typically, the high protein, baked products of the present invention begin with a high protein dough composition that differs little from the baked, high protein product. Although the moisture level decreases and the leavening agent decomposes during baking, the amounts of protein present in the baked product are substantially the same as those present in the dough composition used to prepare the baked product. A dough composition suitable for producing a baked, edible, high protein product of the invention, having a protein concentration, based on calories, of at least 25%, includes:

(a) a mixture of high protein components,
(b) flour,
(c) leavening agent,
(d) sweetener, and
(e) water.

The mixture of high protein components used as a major component in the high protein dough composition of the invention includes:

(i) at least one high protein material derived from a vegetable or dairy source,
(ii) an edible food fiber derived from a vegetable source, and
(iii) an edible emulsifier.

The process of preparing the high protein edible compositions of the invention involves combining the above described components to form high protein dough formulations and baking the high protein formulations of the invention for a period of time and at a temperature sufficient to form a baked product but at such temperature and period of time which will not cause a significant amount of denaturing or degradation of the protein present in the formulation. At the completion of baking, the high protein edible product is packaged and sealed within an air-impermeable, moisture-impermeable film barrier which preserves product integrity over a period of time and stabilizes the protein and moisture levels).

BEST MODES OF THE INVENTION

The present invention combines several edible components which include high concentrations of proteins. Preferably, these high protein concentration components are blended together, preferably in the dry state, to form a mixture of high protein components, referred to herein as a "protein blend." The protein blend, in which the components are present in specified proportions, may be premixed and added to various formulations as if it was a single ingredient. The high protein concentration starting materials are derived from either dairy or vegetable sources and are all commercially available. The materials derived from vegetable sources that may be used to form the protein blend of the invention include protein available from high protein legumes and grains, such as soy, wheat, rye and rice. Preferred high protein components derived from vegetable sources that may be used in the present invention include soy protein, rice protein, soy flour, soy isolate, wheat concentrate, nuts and soy nuts. Materials which may be used in the protein blend that are derived from dairy sources include casein, sodium caseinate, potassium caseinate, calcium caseinate, dried egg whites, milk powder, whey powder and whey isolates. In addition to materials which are added to contribute primarily to the high protein concentration of the dough composition and baked product, the protein blend preferably also includes a source of vegetable fiber. This provides a well-balanced nutritional product, as well as assisting in preparing a better after. Preferred are wheat fiber and inulin. The latter is most preferred because it contributes both to fiber content and protein content, as well as requiring less water to make the batter and is smoother when hydrated. A preferred protein blend for use in the dough composition of the invention includes a mixture of:

(a) at least one of casein, sodium caseinate and calcium caseinate,
(b) dried egg whites,
(c) inulin,
(d) at least one of soy protein and rice protein, and
(e) lecithin.

Most preferred the protein blend of the invention includes by weight, a mixture of:

| | |
|---|---|
| sodium or calcium caseinate | 38 to 42%, |
| dried egg whites | 28 to 32%, |
| inulin | 11 to 13%, |
| soy protein | 9.5 to 11%, |
| rice protein | 9 to 11%, and |
| soy lecithin | 2 to 3.5%. |

Particularly preferred is the protein blend which includes, by weight, a mixture of:

| | |
|---|---|
| sodium or calcium caseinate | 38.4%, |
| dried egg whites | 28.8%, |
| inulin | 11.2%, |
| soy protein | 9.6%, |
| rice protein | 9.5%, and |
| soy lecithin | 2.5%. |

Sufficient water and/or other sources of moisture are added to the dough composition to permit adequate mixing and blending of the ingredients, without overworking the dough. The amount of water added or moisture content of the dough is also commensurate with the type and texture of the baked product being produced (e.g., a cookie, cake, pretzel etc.). Moisture or water may provided by some of the ingredients used in the dough compositions, such as syrup sweeteners, fruit pastries, etc. The amount of water added to the dough also depends in part on temperature, humidity and the type of baked product sought. In the final baked product between about 11% and about 15% of moisture is preferred. Preferably, the compositions of the present invention also include glycerine, (most preferably vegetable glycerine), and lecithin. These components provide several useful attributes to the dough compositions and the final baked products These two preferred ingredients contribute to low glycemic sweetness, provide an even spread during the production process, retard spoilage, stabilize the product over time, and contribute to the sweetness of the product. In addition, lecithin acts as an emulsifier and as an antioxidant.

The retained moisture, which is provided primarily by water, glycerine and lecithin, preferably soy lecithin, contributes in creating a more stable product over time. Lecithin and glycerin are substances having low glycemic index values. The glycemic index, as indicated above, is a rating which is applied to carbohydrates and measures the rate at which the carbohydrate enters the blood stream of an animal consuming that carbohydrate. Generally, more complex carbohydrates have lower glycemic index values since they are assimilated and metabolized more slowly than simpler carbohydrates such as sugars. Except where required for rapid conversion of a carbohydrate to energy, many nutritionists consider foods with low glycemic index values to be preferred since they are more slowly converted to usable energy or glycogen and are less likely to be converted to and stored as fat.

This also means that there are fewer fluctuations in the body's blood sugar levels since lower glycemic index foods do not elicit a large insulin response. Another feature of low glycemic index foods is that they result in the body burning more calories due to thermic effects, since lower glycemic index foods are more difficult for the body to break down and digest.

The basic dough composition of the invention also includes flour or a constituent of flour, such as gluten. Although a standard wheat flour or combinations of wheat flour and other flours conventionally used for making baked products, e.g., nut flour, bran flour, etc. may be used, preferably a high protein flour, such as soy flour, is employed. Preferred is soy flour because of its high protein and other characteristics which contribute to the processing of the dough and the properties of the baked product. Nut flour, such as peanut flour, may be used to provide not only protein and other desirable components of flour but also taste characteristics.

In addition to the inclusion of the protein blend (which contributes most significantly to the high protein concentration of the baked edible compositions of the invention), water, and low glycemic index value components, other components are added to contribute to taste and texture. These include sweeteners, such as sugars and syrups. Preferred among these are crystalline fructose, and sweetener-containing syrups, such as rice syrup and molasses. A preferred sweetener is a blend of white grape juice and rice syrup, known by the tradename, Fruitsource.

A leavening agent is preferably employed, such as baking powder or baking soda, with the latter being preferred. Various spices and flavoring agents and other components which provide particular textural characteristics may also be added. These include fruit pastes, such as raisin and date pastes; rolled oats; nuts; and raisins.

As with many baked products, the manner and order of combining ingredients influences the baked product. Accordingly, in this invention, ingredients are added in groups at various stages of the blending process to facilitate blending, to preserve the integrity of the proteinaceous components and avoid their degradation, and to avoid over-processing of the components, resulting in undesirable textural characteristics. To satisfy these requirements, the ingredients are added to a mixer, preferably a horizontal mixer, in groups with the speed and duration of blending adjusted to the components undergoing mixing. In each stage of the blending process, liquid is either added in the form of one of the components or is present from a previous stage of blending. To achieve some of the desirable characteristics of the edible high protein baked compositions of the invention, the protein blend which contributes most significantly to the high concentration of protein in the baked product is preferably added after the initial stage. Those ingredients which differentiate one baked variety from another are typically added in the last added group of components. Such ingredients are generally those components which are solid and larger in size than the other components of the dough compositions. For example, nuts, raisins, dates, etc., are frequently added during the last stage of blending. Furthermore, some of the components may be added at several stages during the dough preparation process to facilitate improved dough characteristics. This may include one or more of the components of the protein blend.

The table presented below shows the ingredients and the order of addition for a typical cookie composition according to the invention.

| Stage | Ingredients | Key Functions | Mixer Speed/Time |
|---|---|---|---|
| 1 | Date Paste | Flavor, Moisture | Low - 5 min. |
|   | Raisin Paste | Flavor, Moisture | |
|   | Rice Syrup | Sweetener, Texture | |
|   | Sweetener (Fruitsource Plus) | Liquid Sweetener | |
| 2 | Crystalline Fructose | Sweetener | Low - 3 min. |
|   | Calcium Caseinate | Protein Source | |
|   | Soy Protein | Protein Source | |
|   | Inulin | Fiber | |
|   | Baking Soda | Leavening | |
|   | Cinnamon | Flavor | |
|   | All Spice | Flavor | |
|   | Powdered Egg Whites | Protein Source | |
|   | Golden B Dark Molasses | Flavor and Sweetener | |
|   | Sweetener (Fruitsource Plus) | Liquid Sweetener | |
|   | Glycerine | Shelf Life Extender | |
| 3 | Egg Whites | Protein, Moisture | Low - 2 min. |
|   | Natural Vanilla | Flavor | |
|   | Lecithin | Emulsifier, Spoilage Retardant | |
|   | Water | Moisture | |
|   | Ammonia in Water | Processing Aid | |
| 4 | Soy Flour | Protein | Low - 3 min. |
|   | Regular Oats | Texture | |
|   | Quick Oats | Texture | |
|   | Whey Powder (Benchmate) | Richness | |
| 5 | Midget Raisins | Flavor | Low - 1½ min. |
|   | Soy Nuts | Texture, protein | |

Depending upon the volume of materials being blended, a commercial blender or dough mixing machine of suitable volume and type may be employed.

Once the components are mixed, to maintain protein blend integrity, it is preferred to keep the mixed dough in an idle state for as short a time as possible prior to baking. Generally, the time is about 10 to about 60 minutes. Preferably this resting period is maintained for about 15 minutes or less for the preferred cookie type of baked product of the invention. Longer idle periods prior to baking cause loss of moisture, adversely affecting the baked product. The dough lay time of 15 minutes is also provided for initiation of chemical reactions of some of the components. To assure the desired texture of the baked product, prior to baking the mixed dough is covered, preferably with plastic sheeting, and maintained at a constant temperature and relative humidity. Preferably, the temperature is maintained at room temperature of about 65° to about 78° F., most preferably about 70° F., and a relative humidity of about 45 to 50% humidity.

To avoid degradation of protein during baking, a suitable combination of temperature and baking duration are employed. A preferred range of temperatures employed commercially in the invention is significantly lower than those employed commercially in preparing lower protein products of the same type. A preferred embodiment of the present invention is a high protein cookie or biscuit. Commercial baking of standard cookies (i.e., non-high protein cookies having protein less than about 25%, by weight, based on calories) is conducted at a temperature of about 450° to 470° F. The present invention employs a baking temperature of about 320° to about 365° F. to prepare the various baked products of the invention. To prepare the cookies of the present invention, a baking temperature is employed of preferably about 335° F. For preparing high protein cookies of the invention, a duration of baking in the range of about 11 minutes to about 16 minutes is used in the temperature range set forth above.

To assure retention of both proteinaceous concentrations and the desired texture of the product, the edible high protein baked products of the invention are packaged in air- and moisture-impervious containers shortly after baking. Preferably, packaging occurs within 15 to 20 minutes after leaving the oven. As with the dough prior to baking, it is preferred that the baked product be maintained in a constarit temperature and humidity environment after baking and prior to packaging. Preferably the same temperature and humidity conditions in which the blended dough was maintained prior to baking may be used for the baked product prior to packaging. The edible baked high protein products of the present invention are packaged with a film that provides an impervious barrier to both moisture and gas. Preferred is a laminated film formed from a layer of polyester, an adhesive, a layer of metalized polyester, and a polyextruded layer. Particularly preferred is a laminated film barrier structure composed of: a 48 gauge (12 micron) uncoated polyester, an adhesive layer, a 48 gauge vapor deposited aluminum oxide on polyester, and a 60 gauge (15 micron) polyextruded layer.

What is claimed is:

1. A dough composition for producing a baked, edible, high protein product having a protein concentration, based on calories, of at least 25%, comprising:
   (a) a mixture of high protein components,
   (b) flour,
   (c) leavening agent,
   (d) sweetener, and
   (e) water.

2. The dough composition according to claim 1, wherein the mixture of high protein components comprises:
   (i) at least one high protein material derived from a vegetable or dairy source,
   (ii) an edible food fiber derived from a vegetable source, and
   (iii) an edible emulsifier.

3. The dough composition according to claim 2, wherein the at least one high protein material is derived from a vegetable source and comprises at least one of:
   soy protein, soy flour, soy isolate, wheat concentrate, rice protein, rice concentrate, nuts and soy nuts.

4. The dough composition according to claim 2, wherein the at least one high protein material is derived from a dairy source and comprises at least one of:
   casein, sodium caseinate, calcium caseinate, milk powder, dried egg whites, whey powder and whey isolates.

5. The dough composition according to claim 2, wherein said emulsifier comprises soy lecithin.

6. The dough composition according to claim 2, wherein said source of vegetable fiber comprises at least one of wheat fiber and inulin.

7. The dough composition according to claim 2, wherein said emulsifier comprises lecithin.

8. The dough composition according to claim 2, wherein said at least one high protein material comprises a mixture of:
   (a) at least one of casein, sodium caseinate and potassium caseinate,
   (b) dried egg whites,
   (c) inulin,
   (d) at least one of soy protein and rice protein,. and
   (e) lecithin.

9. The dough composition according to claim 2, wherein said at least one high protein material comprises, by weight, a mixture of:

| | |
|---|---|
| sodium or calcium caseinate | 38 to 42%, |
| dried egg whites | 28 to 32%, |
| inulin | 11 to 13%, |
| soy protein | 9.5 to 11%, |
| rice protein | 9 to 11%, and |
| soy lecithin | 2 to 3.5%. |

10. The dough composition according to claim 2, wherein said at least one high protein material comprises, by weight, a mixture of

| | |
|---|---|
| sodium or calcium caseinate | 38.4%, |
| dried egg whites | 28.8%, |
| inulin | 11.2%, |
| soy protein | 9.6%, |
| rice protein | 9.5%, and |
| soy lecithin | 2.5%. |

11. The method according to claim 2, wherein the at least one high protein material is derived from a dairy source and comprises at least one of:
casein, sodium caseinate, calcium caseinate, milk powder, dried egg whites, whey powder and whey isolates.

12. The method according to claim 2, wherein said source of vegetable fiber comprises at least one of wheat fiber and inulin.

13. The dough composition according to claim 1, wherein said flour comprises soy flour.

14. The dough composition according to claim 1, wherein said sweetener comprises a low glycemic sweetener.

15. The dough composition according to claim 1, wherein said sweetener comprises at least one of crystalline fructose and rice syrup.

16. A baked, edible, high protein product having a protein concentration, based on calories, of at least 25%, formed from a dough composition comprising:
(a) a mixture of high protein components,
(b) flour,
(c) leavening agent,
(d) sweetener, and
(e) water.

17. The baked, edible, high protein product according to claim 16, wherein the mixture of high protein components comprises:
(i) at least one high protein material derived from a vegetable or dairy source,
(ii) an edible food fiber derived from a vegetable source, and
(iii) an edible emulsifier.

18. The baked, edible, high protein product according to claim 17, wherein the at least one high protein material is derived from a vegetable source and comprises at least one of:
soy protein, soy flour, soy isolate, wheat concentrate, rice protein, rice concentrate, nuts and soy nuts.

19. The baked, edible, high protein product according to claim 17, wherein the at least one high protein material is derived from a dairy source and comprises at least one of:
casein, sodium caseinate, calcium caseinate, milk powder, dried egg whites, whey powder and whey isolates.

20. The baked, edible, high protein product according to claim 17, wherein said source of vegetable fiber comprises at least one of wheat fiber and inulin.

21. The baked, edible, high protein product according to claim 17, wherein said emulsifier comprises lecithin.

22. The baked, edible, high protein product according to claim 17, wherein said emulsifier comprises soy lecithin.

23. The baked, edible, high protein product according to claim 16, wherein said sweetener comprises at least one of crystalline fructose and rice syrup.

24. The baked, edible, high protein product according to claim 17, wherein said at least one high protein material comprises a mixture of:
(a) at least one of casein, sodium caseinate and calcium caseinate,
(b) dried egg whites,
(c) inulin,
(d) at least one of soy protein and rice protein, and
(e) lecithin.

25. The baked, edible, high protein product according to claim 17, wherein said at least one high protein material comprises, by weight, a mixture of:

| | |
|---|---|
| sodium or calcium caseinate | 38 to 42%, |
| dried egg whites | 28 to 32%, |
| inulin | 11 to 13%, |
| soy protein | 9.5 to 11%, |
| rice protein | 9 to 11%, and |
| soy lecithin | 2 to 3.5%. |

26. The baked, edible, high protein product according to claim 17 wherein said at least one high protein material comprises, by weight, a mixture of:

| | |
|---|---|
| sodium or calcium caseinate | 38.4%, |
| dried egg whites | 28.8%, |
| inulin | 11.2%, |
| soy protein | 9.6%, |
| rice protein | 9.5%, and |
| soy lecithin | 2.5%. |

27. The baked, edible, high protein product according to claim 16, wherein said flour comprises soy flour.

28. The baked, edible, high protein product according to claim 16, wherein said sweetener comprises a low glycemic sweetener.

29. The baked, edible, high protein product of claim 16, wherein said product contains between 11% and 15% of moisture.

30. The method according to claim 29, wherein said baking is conducted at a temperature of about 335° F.

31. A method of preparing a dough composition for producing a baked, edible, high protein product having a protein concentration, based on calories, of at least 25%, comprising mixing together:
(a) a mixture of high protein components,
(b) flour,
(c) leavening agent,
(d) sweetener, and
(e) water
to form said dough composition.

32. The method of preparing a dough composition according to claim 31, wherein the mixture of high protein components comprises:
(i) at least one high protein material derived from a vegetable or dairy source,
(ii) an edible food fiber derived from a vegetable source, and (iii) an edible emulsifier.

33. The method of preparing a dough composition according to claim 32, wherein the at least one high protein material is derived from a vegetable source and comprises at least one of:

soy protein, soy flour, soy isolate, wheat concentrate, rice protein, rice concentrate, nuts and soy nuts.

34. The method of preparing a dough composition according to claim 32, wherein the at least one high protein material is derived from a dairy source and comprises at least one of:

casein, sodium caseinate, calcium caseinate, milk powder, dried egg whites, whey powder and whey isolates.

35. The method of preparing a dough composition according to claim 32, wherein said source of vegetable fiber comprises at least one of wheat fiber and inulin.

36. A method for producing a baked, edible, high protein product having a protein concentration, based on calories, of at least 25%, comprising preparing a dough composition comprising:

(a) a mixture of high protein components, (b) flour, (c) leavening agent, (d) sweetener, and (e) water by mixing components (a) to (e), shaping the dough composition into individual portions and baking the portions to produce baked, edible high protein products.

37. The method according to claim 36, wherein the mixture of high protein components comprises:

(i) at least one high protein material derived from a vegetable or dairy source, (ii) an edible food fiber derived from a vegetable source, and (iii) an edible emulsifier.

38. The method according to claim 37, wherein the at least one high protein material is derived from a vegetable source and comprises at least one of:

soy protein, soy flour, soy isolate, wheat concentrate, rice protein, rice concentrate, nuts and soy nuts.

39. The method according to claim 36, wherein said baking is conducted at a temperature of about 320° F. to about 365° F.

40. The method according to claim 36, wherein said baking is conducted for a duration in the range of about 11 minutes to about 16 minutes.

41. A baked, edible, high protein product having a protein concentration, based on calories, of at least 25%, comprising:

(a) a mixture of high protein components, (b) flour, (c) leavening agent, (d) sweetener, and (e) water.

42. The baked, edible, high protein product according to claim 41, wherein the mixture of high protein components comprises:

(i) at least one high protein material derived from a vegetable or dairy source, (ii) an edible food fiber derived from a vegetable source, and (iii) an edible emulsifier.

43. The baked, edible, high protein product according to claim 42, wherein the at least one high protein material is derived from a vegetable source and comprises at least one of:

soy protein, soy flour, soy isolate, wheat concentrate, rice protein, rice concentrate, nuts and soy nuts.

44. The baked, edible, high protein product according to claim 42, wherein the at least one high protein material is derived from a dairy source and comprises at least one of:

casein, sodium caseinate, calcium caseinate, milk powder, dried egg whites, whey powder and whey isolates.

45. The baked, edible, high protein product according to claim 42, wherein said source of vegetable fiber comprises at least one of wheat fiber and inulin.

46. The baked, edible, high protein product according to claim 42, wherein said emulsifier comprises lecithin.

47. The baked, edible, high protein product according to claim 42, wherein said emulsifier comprises soy lecithin.

48. The baked, edible, high protein product according to claim 42, wherein said at least one high protein material comprises a mixture of:

(a) at least one of casein, sodium caseinate and calcium caseinate, (b) dried egg whites, (c) inulin, (d) at least one of soy protein and rice protein, and (e) lecithin.

49. The baked, edible, high protein product according to claim 42, wherein said at least one high protein material comprises, by weight, a mixture of:

| | |
|---|---|
| sodium or calcium caseinate | 38 to 42%, |
| dried egg whites | 28 to 32%, |
| inulin | 11 to 13%, |
| soy protein | 9.5 to 11%, |
| rice protein | 9 to 11%, and |
| soy lecithin | 2 to 3.5%. |

50. The baked, edible, high protein product according to claim 42, wherein said at least one high protein material comprises, by weight, a mixture of:

| | |
|---|---|
| sodium or calcium caseinate | 38.4%, |
| dried egg whites | 28.8%, |
| inulin | 11.2%, |
| soy protein | 9.6%, |
| rice protein | 9.5%, and |
| soy lecithin | 2.5%. |

51. The baked, edible, high protein product according to claim 41, wherein said flour comprises soy flour.

52. The baked, edible, high protein product according to claim 41, wherein said sweetener comprises a low glycemic sweetener.

53. The baked, edible, high protein product according to claim 41, wherein said sweetener comprises at least one of crystalline fructose and rice syrup.

54. The baked, edible, high protein product of claim 41, wherein said product contains between 11% and 15% of moisture.

* * * * *